(12) United States Patent
Ryu et al.

(10) Patent No.: US 11,983,315 B2
(45) Date of Patent: May 14, 2024

(54) AUGMENTED REALITY DEVICE AND METHOD FOR DETECTING GAZE OF USER

(71) Applicant: Samsung Electronics Co., Ltd., Suwon-si (KR)

(72) Inventors: Jaeyeol Ryu, Suwon-si (KR); Doyoun Kim, Suwon-si (KR); Bonkon Koo, Suwon-si (KR); Kyookeun Lee, Suwon-si (KR); Jaewoo Ko, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 78 days.

(21) Appl. No.: 17/903,616

(22) Filed: Sep. 6, 2022

(65) Prior Publication Data
US 2023/0038781 A1  Feb. 9, 2023

Related U.S. Application Data

(63) Continuation of application No. PCT/KR2022/011693, filed on Aug. 5, 2022.

(30) Foreign Application Priority Data

Aug. 5, 2021   (KR) .................. 10-2021-0103476
Nov. 8, 2021   (KR) .................. 10-2021-0152571

(51) Int. Cl.
G06F 3/01   (2006.01)
G02B 27/01   (2006.01)
(Continued)

(52) U.S. Cl.
CPC .......... *G06F 3/013* (2013.01); *G02B 27/0172* (2013.01); *G02C 7/06* (2013.01);
(Continued)

(58) Field of Classification Search
CPC ...... G02B 2027/0138; G02B 2027/014; G02B 2027/0178; G02B 2027/0187;
(Continued)

(56) References Cited

U.S. PATENT DOCUMENTS 9,916,690 B2   3/2018   Nobori et al.
10,371,945 B2   8/2019   Samec et al.
(Continued)

FOREIGN PATENT DOCUMENTS

DE   10 2018 214 637 A1   3/2020
JP   2019-516204 A   6/2019
(Continued)

OTHER PUBLICATIONS

International Search Report dated Nov. 14, 2022, issued in International Patent Application No. PCT/KR2022/011693.
(Continued)

*Primary Examiner* — Robin J Mishler
(74) *Attorney, Agent, or Firm* — Jefferson IP Law, LLP

(57) ABSTRACT

A method, performed by an augmented reality (AR) device including a vision correction lens, of detecting a gaze of a user is provided. The method includes obtaining lens characteristic information about the vision correction lens arranged to overlap a light guide plate in a gaze direction of the user, emitting light for gaze tracking toward a light reflector through a light emitter, wherein the emitted light is reflected by the light reflector and then directed to an eye of the user, receiving a light reflected by the eye of the user through a light receiver, obtaining an eye image of the user based on the light received, adjusting the eye image of the user based on the lens characteristic information about the vision correction lens, and obtaining gaze information based on the adjusted eye image.

18 Claims, 11 Drawing Sheets

(51) Int. Cl.
    *G02C 7/06*               (2006.01)
    *G02C 11/00*            (2006.01)
    *G06T 5/80*               (2024.01)
    *G06T 7/73*               (2017.01)

(52) U.S. Cl.
    CPC ............... *G02C 11/10* (2013.01); *G06T 5/80* (2024.01); *G06T 7/73* (2017.01); *G02B 2027/014* (2013.01); *G02B 2027/0178* (2013.01); *G06T 2207/30201* (2013.01)

(58) Field of Classification Search
    CPC .. G02B 27/0093; G02B 27/0172; G02C 7/06; G02C 7/081; G06F 3/011; G06F 3/013
    See application file for complete search history.

(56) References Cited

U.S. PATENT DOCUMENTS

| | | | |
|---|---|---|---|
| 10,373,297 B2 | 8/2019 | Malaika et al. | |
| 10,613,625 B2 | 4/2020 | Huang et al. | |
| 10,656,423 B2 | 5/2020 | Kim et al. | |
| 11,099,100 B2 | 8/2021 | Glasenapp | |
| 11,125,550 B2 | 9/2021 | Loferer et al. | |
| 11,520,152 B1 * | 12/2022 | Lau ........................ | G02B 6/102 |
| 2016/0042221 A1 | 2/2016 | Mei et al. | |
| 2017/0115483 A1 | 4/2017 | Aleem et al. | |
| 2020/0033560 A1 * | 1/2020 | Weber ..................... | G02B 7/14 |
| 2021/0109591 A1 * | 4/2021 | Andersson ......... | G02B 27/0093 |
| 2021/0271320 A1 | 9/2021 | Fiess et al. | |

FOREIGN PATENT DOCUMENTS

| | | |
|---|---|---|
| KR | 10-2017-0041862 A | 4/2017 |
| KR | 10-2019-0069563 A | 6/2019 |
| KR | 10-2020-0136449 A | 12/2020 |
| KR | 10-2021-0023921 A | 3/2021 |
| KR | 10-2021-0049868 A | 5/2021 |

OTHER PUBLICATIONS

Dahlberg, "Eye Tracking With Eye Glasses," Jan. 25, 2010, UMEA University, Sweden.

* cited by examiner

FIG. 9
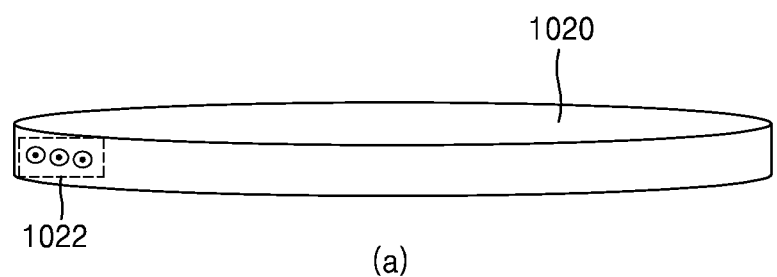
(a)
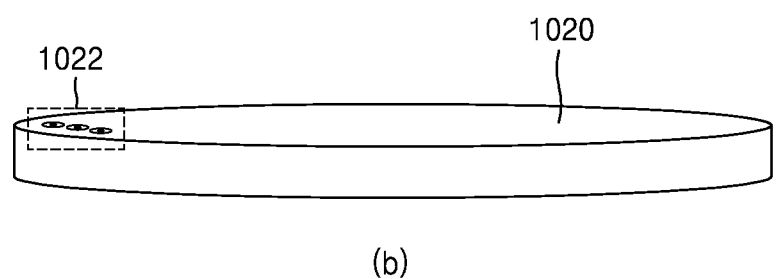
(b)

FIG. 10
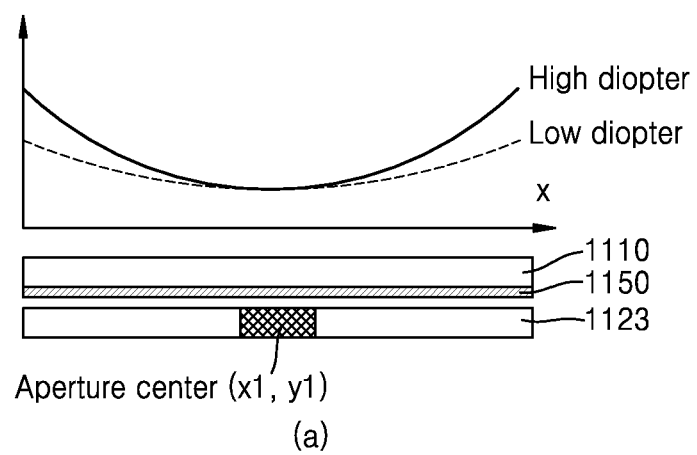
(a)
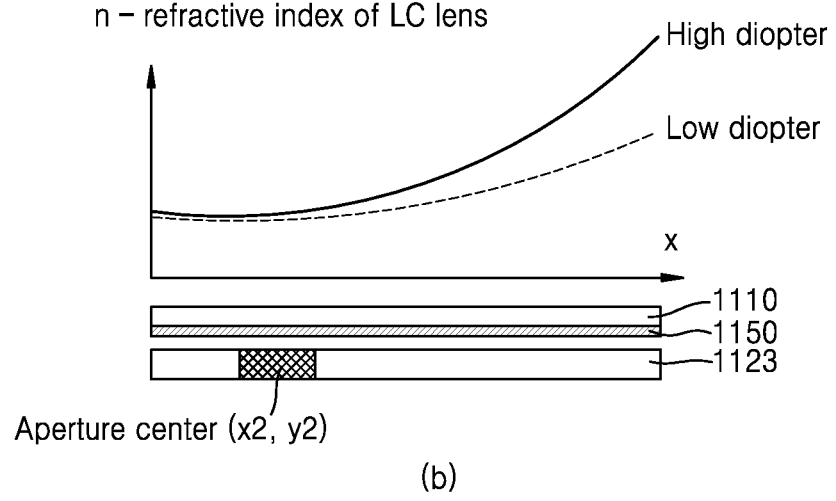
(b)

AUGMENTED REALITY DEVICE AND METHOD FOR DETECTING GAZE OF USER

CROSS-REFERENCE TO RELATED APPLICATION(S)

This application is a continuation application, claiming priority under § 365(c), of an International application No. PCT/KR2022/011693, filed on Aug. 5, 2022, which is based on and claims the benefit of a Korean patent application number 10-2021-0103476, filed on Aug. 5, 2021, in the Korean Intellectual Property Office, and of a Korean patent application number 10-2021-0152571, filed on Nov. 8, 2021, in the Korean Intellectual Property Office, the disclosure of each of which is incorporated by reference herein in its entirety.

TECHNICAL FIELD

The disclosure relates to an augmented reality (AR) device and method for detecting a gaze of a user. More particularly, the disclosure relates to a gaze tracking sensor and a method for detecting a gaze of a user in an AR device including a vision correction lens.

BACKGROUND ART

Augmented reality (AR) is a technology for synthesizing virtual objects or information in a real environment to allow the virtual objects or information to look like objects existing in a real physical environment. The modern computing and display technology have allowed the development of systems for AR experience. In an AR experience, a digitally regenerated image or a portion thereof may be considered to be real or may be presented to a user in such a way as to be recognized as a real image.

Moreover, most AR devices have the form of a head-mounted display (HMD), and such AR devices are inconvenient to use while wearing glasses for vision correction. Correcting the vision of a person wearing glasses for vision correction may be complex due to myopia, hyperopia, astigmatism, or any combination thereof. When the user requiring vision correction uses an AR device without wearing glasses for vision correction, it may be impossible to recognize an image to describe the real physical environment and the level of immersion in AR may degrade. Accordingly, in order to also provide a realistic AR experience to the user not wearing separate glasses, an AR device including a vision correction lens has been developed.

In various applications using an AR or virtual reality (VR) device, information about the gaze direction of the user wearing the device is often required. The gaze direction information may be used for various operations such as constructing a user interface, optimizing rendering of an image provided to the user (e.g., foveated rendering), or determining a distance to an object that the user is looking at. The gaze direction information may be generated by a user's eye position tracking sensor (hereinafter also referred to as a gaze tracking sensor (eye tracking (ET) sensor)).

Thus, there is a need to develop a gaze tracking method capable of improving the accuracy of detecting the gaze of the user in an AR device including a vision correction lens.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide a gaze tracking method and device capable of improving the accuracy of gaze detection in an augmented reality (AR) device including a vision correction lens.

Additional aspects will be set forth in part in the description which follows and, in part, will be apparent from the description, or may be learned by practice of the presented embodiments.

Solution to Problem

In accordance with an aspect of the disclosure, an augmented reality (AR) device is provided. The AR device includes a light guide plate, a vision correction lens arranged to overlap the light guide plate in a gaze direction of a user wearing the AR device, a support unit for fixing the AR device to a face of the user wearing the AR device, a gaze tracking sensor including a light receiver and a light emitter installed at a portion of the support unit, a light reflector for reflecting light for gaze tracking, and at least one processor. The at least one processor may be configured to obtain lens characteristic information about the vision correction lens, emit the light for gaze tracking toward the light reflector by controlling the light emitter, obtain an eye image of the user based on light received through the light receiver, adjust the eye image of the user based on the lens characteristic information, and obtain gaze information of the user from the adjusted eye image. The light emitted toward the light reflector may be reflected by the light reflector and directed to an eye of the user, and the light received through the light receiver may include light reflected by the eye of the user among the light directed to the eye of the user. The light reflector may include a pattern. The at least one processor may be further configured to emit light for obtaining the lens characteristic information about the vision correcting lens toward the light reflector by controlling the light emitter, identify a distorted pattern based on the light received through the light receiver, and obtain the lens characteristic information about the vision correction lens based on the distorted pattern.

In accordance with another aspect of the disclosure, a method, performed by an augmented reality (AR) device including a vision correction lens, of detecting a gaze of a user is provided. The method includes obtaining lens characteristic information about the vision correction lens arranged to overlap a light guide plate for displaying an image output from the AR device in a gaze direction of the user, emitting light for gaze tracking toward a light reflector through a light emitter installed at a portion of a support unit of the AR device, wherein the emitted light is reflected by the light reflector and directed to an eye of the user wearing the AR device, receiving a light reflected by the eye of the user through a light receiver installed at the support unit, obtaining an eye image of the user based on the light received through the light receiver, adjusting the eye image of the user based on the lens characteristic information about the vision correction lens, and obtaining gaze information of the user based on the adjusted eye image.

In accordance with another aspect of the disclosure, a computer-readable recording medium may have recorded thereon a program for executing at least one of embodiments of the described method in a computer is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 9 is a diagram for describing an operation of obtaining lens characteristic information about a vision correction lens, according to an embodiment of the disclosure;

FIG. 10 is a diagram for describing a control parameter of a vision correction lens according to an embodiment of the disclosure.

Throughout the drawings, it should be noted that like reference numbers are used to depict the same or similar elements, features, and structures.

MODE OF DISCLOSURE

Figure 1:
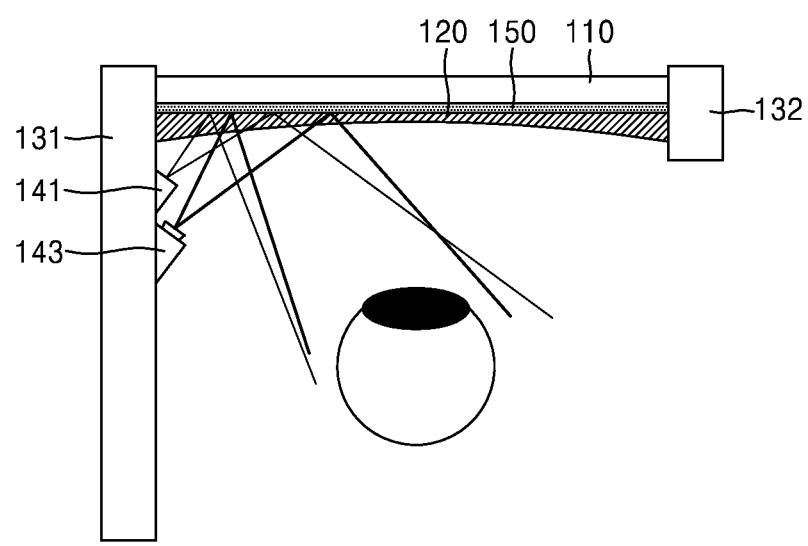
FIG. 1 is a schematic diagram illustrating a method of tracking a gaze of a user in an augmented reality (AR) device including a vision correction lens, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Throughout the disclosure, when something is referred to as "including" an element, one or more other elements may be further included unless specified otherwise. Also, as used herein, terms such as "units" and "modules" may refer to units that perform at least one function or operation, and the units may be implemented as hardware or software or a combination of hardware and software.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some case, the expression "a system configured to" may mean that the system is "capable of" along with other devices or components. For example, "a processor configured to (or set to) perform A, B, and C" may refer to a dedicated processor (e.g., an embedded processor) for performing a corresponding operation, or a general-purpose processor (e.g., a central processing unit (CPU) or an application processor) capable of performing a corresponding operation by executing one or more software programs stored in a memory.

Herein, an "augmented reality (AR) system" may refer to a system displaying a virtual image in a physical environment space of the real world or displaying a real-world object and a virtual image together.

Herein, an 'AR device' may be a device capable of representing 'AR' and may include AR glasses in the form of glasses worn by the user on the face, a head-mounted display (HMD), a virtual reality headset (VRH), or an AR helmet worn on the head, or the like.

Herein, a 'real scene' may be a scene of the real world that the user sees through the AR device and may include a real-world object. A 'virtual image' may be an image generated through an optical engine and may include both a static image and a dynamic image. The virtual image may be observed together with a real scene and may be an image representing information about a real-world object in a real scene, information about an operation of the AR device, a control menu, or the like.

In an embodiment of the disclosure, an AR device may include an optical engine for generating a virtual image including light generated from a light source, and a light guide plate (waveguide) that guides a virtual image generated by the optical engine to the user's eye and is formed of a transparent material such that a scene of the real world may also be viewed together. Because the AR device should also be able to observe a scene in the real world together, it may basically require an optical element for changing the path of light having straightness in order to guide the light generated by the optical engine to the user's eye through the light guide plate. In this case, the light path may be changed by using reflection by a mirror or the like, or the light path may be changed through diffraction by a diffraction element such as a diffractive optical element (DOE) or a holographic optical element (HOE); however, the disclosure is not limited thereto.

Hereinafter, the disclosure will be described in detail with reference to the accompanying drawings.

FIG. 1 is a schematic diagram illustrating a method of tracking a gaze of a user in an AR device including a vision correction lens (prescription lens), according to an embodiment of the disclosure.

An AR device according to an embodiment of the disclosure may be a device capable of representing AR and may display an image including a virtual object and a physical object existing in reality.

Referring to FIG. 1, the AR device may be a glasses-type display device and may include a glasses-type body configured to be worn by the user.

The glasses-type body may include a support unit for fixing the AR device to the user's face. The support unit may include a temple 131 and a bridge 132. The temple 131 may be used to fix the AR device to the user's head at the side of the glasses-type body. The bridge 132 may be used to seat the AR device on the user's nose and may include, for example, a glasses bridge and a glasses nose; however, the disclosure is not limited thereto.

In an embodiment of the disclosure, the glasses-type body may further include a frame. A light guide plate 110, a vision correction lens 120, and a light reflector 150 may be arranged at the frame. For example, the frame may be formed to surround the outer circumferential surfaces of the light guide plate 110 and the vision correction lens 120. The light guide plate 110 may be configured to receive and input a projected light in an input area and output at least a portion of the input light in an output area, and the vision correction lens 120 may be arranged between the light guide plate 110 and the user's eye to correct the vision when the user recognizes a scene displayed on the light guide plate 110 or a real scene through the light guide plate 110. In an embodiment of the disclosure, the light guide plate 110 may include a left-eye light guide plate and a right-eye light guide plate, and the vision correcting lens 120 may include a left-eye vision correcting lens and a right-eye vision correcting lens.

The left-eye vision correction lens 120, the left-eye light reflector 150, and the left-eye light guide plate 110 may be arranged at the position corresponding to the user's left eye, and the right-eye vision correction lens, the right-eye light reflector, and the right-eye light guide plate may be arranged at the position corresponding to the user's right eye. For example, the left-eye light reflector 150 may be arranged between the left-eye vision correction lens 120 and the left-eye light guide plate 110 and may be coated on one surface of the left-eye light guide plate 110 or the left-eye vision correction lens 120; however, the disclosure is not limited thereto. Likewise, the right-eye light reflector may be arranged between the right-eye vision correction lens and the right-eye light guide plate and may be coated on one surface of the right-eye light guide plate or the right-eye vision correction lens; however, the disclosure is not limited thereto.

In an embodiment of the disclosure, an optical engine of a projector for projecting a display light including an image may include a left-eye optical engine and a right-eye optical engine. The left-eye optical engine and the right-eye optical engine may be located on both side surfaces of the AR device. Alternatively, one optical engine may be included in a central portion around the bridge 132 of the AR device. The light output from the optical engine may be displayed through the light guide plate 110.

In an embodiment of the disclosure, a gaze tracking sensor may include a light emitter 141 and a light receiver 143. The light emitter 141 and the light receiver 143 may be arranged on the inner surface of the support unit of the AR device at a position between the support unit and the user's eye. The light emitter 141 and the light receiver 143 may be arranged to face the light reflector 150 on the support unit of the AR device. For example, the light emitter 141 and the light receiver 143 may be arranged at a position spaced apart from the light guide plate 110 by about 2 mm to about 25 mm on the side surface of the temple 131 of the AR device in order to emit and receive infrared (IR) light without being disturbed by the user's hair or the like.

The AR device may include the vision correction lens 120 for correcting the vision of the user wearing the AR device. In an embodiment of the disclosure, the vision correction lens 120 may have a preset fixed refractive characteristic or may have a variable refractive characteristic that may vary as necessary.

Figure 2:
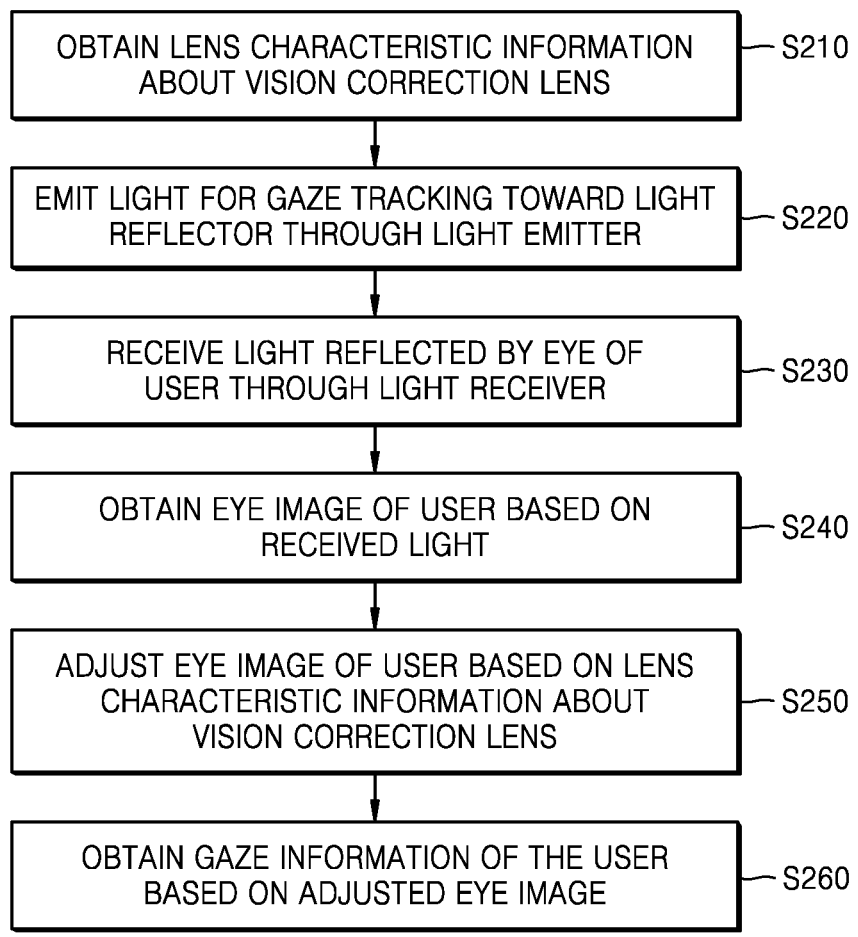
FIG. 2 is a flowchart illustrating a method by which an AR device detects a gaze of a user, according to an embodiment of the disclosure.

FIG. 2 is a flowchart illustrating a method by which an AR device detects a gaze of a user, according to an embodiment of the disclosure.

Referring to FIG. 2, in operation S210, an AR device may obtain lens characteristic information about a vision correction lens. In operation S220, the AR device may emit light for gaze tracking toward the light reflector through the light emitter. In operation S230, the AR device may receive the light reflected by an eye of the user through the light receiver. In operation S240, the AR device may obtain an eye image of the user based on the received light. In operation S250, the AR device may adjust the eye image of the user based on the lens characteristic information about the vision correction lens. In operation S260, the AR device may obtain gaze information of the user based on the adjusted eye image.

Figure 3:
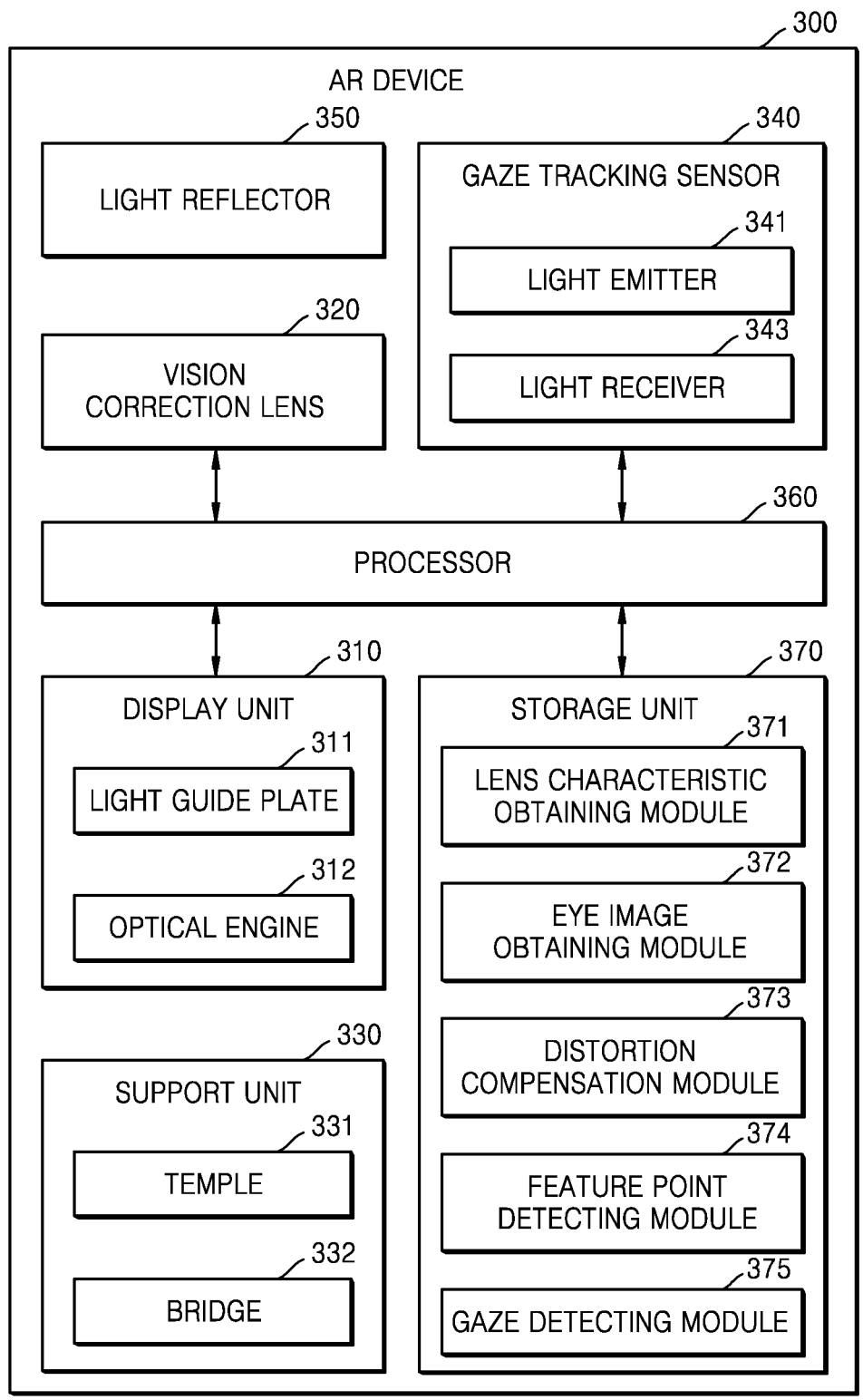
FIG. 3 is a block diagram of an AR device according to an embodiment of the disclosure.

FIG. 3 is a block diagram of an AR device according to an embodiment of the disclosure.

Referring to FIG. 3, an AR device 300 according to an embodiment of the disclosure may include a display unit 310, a vision correction lens 320, a support unit 330, a gaze tracking sensor 340, a light reflector 350, a processor 360, and a storage unit 370.

The display unit 310 may display and output information processed by the AR device 300. For example, the display unit 310 may display information related to a service provided based on an image taken around the AR device 300 and a user interface for photographing around the AR device 300.

According to an embodiment of the disclosure, the display unit 310 may provide an AR image. The display unit 310 according to an embodiment of the disclosure may include a light guide plate (e.g., a waveguide) 311 and an optical engine 312. The light guide plate 311 may include a transparent material through which a partial area of the rear surface is visible when the user wears the AR device 300. The light guide plate 311 may include a flat plate having a single-layer or multilayer structure of a transparent material in which light may be reflected and transmitted. The light guide plate 311 may face an output surface of the optical engine 312 to receive the light of a virtual image projected from the optical engine 312. Here, the transparent material may refer to a material through which light may pass, its transparency may not be 100%, and it may have a certain color. In an embodiment of the disclosure, as the light guide plate 311 is formed of a transparent material, because the user may not only see a virtual object of a virtual image through the display unit 310 but also see an external real scene, the light guide plate 311 may be referred to as a see-through display. The display unit 310 may provide an AR image by outputting a virtual object of a virtual image through the light guide plate 311. When the AR device 300 is a glasses-type device, the display unit 310 may include a left display unit and a right display unit.

The vision correction lens 320 may correct the vision of the user wearing the AR device 300. In an embodiment of the disclosure, the vision correction lens 320 may be arranged between the light guide plate 311 and the user's eye and may correct the vision of the user who recognizes a real scene and a virtual image through the light guide plate 311. The vision correction lens 320 may have a preset fixed refractive characteristic or may have a variable refractive characteristic that may vary as necessary. In an embodiment of the disclosure, the lens characteristic of the vision correction lens 320 may represent the characteristic of the lens that causes an eye image distortion that occurs in the process of obtaining an eye image through the path of a light emitter 341—the vision correction lens 320—the light reflector 350—the vision correction lens 320—the user's eye—the vision correction lens 320—the light reflector 350—the vision correction lens 320—a light receiver 343 when the light reflector 350 is arranged between the vision correction lens 320 and the light guide plate 311. For example, the lens characteristic of the vision correction lens 320 may represent the degree to which the vision correction lens 320 collects or spreads light. The lens characteristic of the vision correction lens 320 may be determined based on the refractive index and the curvature of the refractive surface of the lens. For example, the lens characteristic of the vision correction lens 320 may increase as the refractive index or the curvature of the refractive surface increases. The refractive index may represent the degree to which light and waves are refracted when they pass through an interface (refractive surface) between different mediums. For example, the refractive index may be determined based on the material of the vision correction lens 320. In an embodiment of the disclosure, the lens characteristic information about the vision correction lens 320 may include various numerical values expressed to represent the lens characteristics, in addition to the refractive index or the curvature of the refractive surface.

The light reflector 350 may reflect the light emitted from the light emitter 341 described below. The light reflector 350 and the light guide plate 311 may be arranged to face the user's eye, and the light reflector 350 and the light guide plate 311 may be attached to each other. For example, the light reflector 350 may be coated on at least a partial area of the light guide plate 311. Also, the light reflector 350 may be attached to or coated on other components included in the glasses-type AR device other than the light guide plate, for example, a cover glass installed to protect the vision correction lens 320 or the light guide plate 311. The light reflector 350 may be formed of a material capable of reflecting light such as IR light emitted from the light emitter 341. The light reflector 350 may include, for example, silver, gold, copper, or a material including one or more of such metals; however, the disclosure is not limited thereto. Accordingly, the light emitted from the light emitter 341 may be reflected by the light reflector 350 and directed toward the user's eye, and the light reflected back from the user's eye may be reflected by the light reflector 350 and directed toward the light receiver 343.

The light reflector 350 may be coated on the light guide plate 311 to have a certain pattern. The pattern formed on the light reflector 350 may include, for example, a dot pattern, a line pattern, a grid pattern, a two dimensional (2D) marker, or the like; however, the disclosure is not limited thereto. Also, the pattern formed on the light reflector 350 may be formed, for example, at a portion on the light guide plate 311 where the gaze of the user is directed less frequently. The pattern formed on the light reflector 350 may be formed, for example, at a portion on the light guide plate 311 which does not interfere with photographing or scanning the user's eye. For example, the certain pattern may refer to a pattern formed by a portion where the light emitted from the light emitter 341 is reflected and a portion where the light emitted from the light emitter 341 is not reflected in the light reflector 350. Because the light emitted toward a portion where light is not reflected in the light reflector 350 is not reflected by the light reflector 350, the light receiver 343 may fail to receive the light emitted toward the portion where light is not reflected. Accordingly, a pattern formed by a portion reflecting light and a portion not reflecting light in the light reflector 350 may be detected from the light received by the light receiver 343.

In an embodiment of the disclosure, when the light emitted from the light emitter 341 is IR light, the certain pattern may be formed of a material for reflecting IR light and the material for reflecting IR light may include a material invisible to the user's eye. Because the real-world light or the real scene observed by the user through the AR device 300 mostly includes visible light, the user may observe the real-world light or the real scene without being disturbed by the light reflector 350 with the certain pattern formed therein.

The gaze tracking sensor 340 may include the light emitter 341 and the light receiver 343. The gaze tracking sensor 340 may include the light emitter 341 emitting light for detecting the gaze of the user and the light receiver 343 receiving the light reflected from the user's eye and may detect data related to the gaze of the user wearing the AR device 300.

The light emitter 341 of the gaze tracking sensor 340 may emit light toward the light reflector 350 such that the light reflected by the light reflector 350 may be directed toward the user's eye. The light emitter 341 may emit light toward the light reflector 350, the emitted light may be reflected by the light reflector 350, and the reflected light may be directed toward the user's eye. The light emitter 341 may be arranged at a position where light may be emitted toward the light reflector 350 in the AR device 300. The light emitter 341 may be located on the support unit 330 supporting the AR device 300 on the user's face, such as a temple 331 and a bridge 332.

Also, the light reflected from the user's eye may be reflected by the light reflector 350 and received by the light receiver 343 of the gaze tracking sensor 340. The light directed toward the user's eye may be reflected from the user's eye, the light reflected from the user's eye may be reflected by the light reflector 350, and the light receiver 343 may receive the light reflected by the light reflector 350. The light receiver 343 may be arranged at a position where the light reflected by the light reflector 350 may be received in the AR device 300. The light receiver 343 may be located on the support unit 330 supporting the AR device 300 on the user's face, such as the temple 331 and the bridge 332. Also, for example, the bridge 332 may include a glasses bridge and a glasses nose. Also, the glasses bridge and the glasses nose may be integrally configured; however, the disclosure is not limited thereto.

For example, the light emitter 341 may be an infrared light emitting diode (IR LED) that emits IR light, and the light receiver 343 may be an IR camera that captures IR light. In this case, the IR camera may photograph the user's eye by using the IR light reflected by the light reflector 350. When the light emitter 341 is an IR LED and the light receiver 343 is an IR camera, the light emitter 341 may emit at least one IR light among planar light or point light toward the light reflector 350 and the light receiver 343 may receive a reflected light that is identified when the IR light emitted from the light emitter 341 is sequentially reflected by the light reflector 350, the user's eye, and the light reflector 350. The planar light may be light emitted in the form of a plane, and the planar light emitted from the light emitter 341 may be directed toward at least a portion of the entire area of the light reflector 350. At least a portion of the entire area of the light reflector 350 may be set such that the planar light reflected from at least a portion of the entire area of the light reflector 350 may cover the user's eye.

When the AR device 300 is a glasses-type device, the light emitter 341 and the light receiver 343 may be arranged on the temple 331 of the AR device 300. For example, the light emitter 341 and the light receiver 343 may be arranged on the inner surface of the temple 331 of the AR device 300 at a position between the temple 331 and the user's eye. For example, the light emitter 341 and the light receiver 343 may be arranged at a position spaced apart from the light guide plate 311 by about 2 mm to about 25 mm on the side surface of the temple 331 of the AR device 300. The light emitter 341 and the light receiver 343 may be arranged to face the light reflector 350 on the temple 331 of the AR device 300.

Also, for example, the light emitter 341 and the light receiver 343 may be arranged on the bridge 332 of the AR device 300. The light emitter 341 and the light receiver 343 may be arranged on the inner surface of the bridge 332 of the AR device 300 at a position between the bridge 332 and the user's eye. For example, the light emitter 341 and the light receiver 343 may be arranged at a position spaced apart from the light guide plate 311 by about 2 mm to about 25 mm on the side surface of the bridge 332 of the AR device 300. The light emitter 341 and the light receiver 343 may be arranged to face the light reflector 350 on the bridge 332 of the AR device 300.

The gaze tracking sensor 340 may provide data related to the gaze of the user's eye to the processor 360, and the processor 360 may obtain gaze information of the user based on the data related to the gaze of the user's eye. The data related to the gaze of the user's eye may be data obtained by the gaze tracking sensor 340 and may include data about the wavelength, emission area, light characteristic, emission direction, or the like of the light emitted from the light emitter 341 and data representing the characteristic of the reflected light received from the light receiver 343. Also, the gaze information of the user may be information related to the gaze of the user, may be generated by analyzing the data related to the gaze of the user's eye, and may include, for example, information about the position of the user's pupil, the position of the center point of the pupil, the position of the user's iris, the center of the user's eye, the position of the user's eye glint feature point, the user's gaze point, the user's gaze direction, or the like, however, the disclosure is not limited thereto. The user's gaze direction may be, for example, the direction of the gaze from the center of the user's eye toward the gaze point at which the user gazes. For example, the user's gaze direction may be represented by the value of a vector from the center of the user's left eye toward the gaze point and the value of a vector from the center of the user's right eye toward the gaze point; however, the disclosure is not limited thereto. According to an embodiment of the disclosure, the gaze tracking sensor 340 may detect data related to the gaze of the eye of the user wearing the AR device 300 at predetermined time intervals.

The storage unit 370 may store a program to be executed by the processor 360 described below and may store data input to or output from the AR device 300.

The storage unit 370 may include at least one of an internal memory (not illustrated) or an external memory (not illustrated). The internal memory may include, for example, at least one of a volatile memory (e.g., dynamic random access memory (DRAM), static RAM (SRAM), synchronous dynamic RAM (SDRAM), or the like), a non-volatile memory (e.g., one-time programmable read only memory (OTPROM), programmable ROM (PROM), erasable and programmable ROM (EPROM), electrically erasable and programmable ROM (EEPROM), mask ROM, flash ROM, or the like), a hard disk drive (HDD), or a solid state drive (SSD). According to an embodiment of the disclosure, the processor 360 may load a command or data received from at least one of the non-volatile memory or other components into the volatile memory and process the same. Also, the processor 360 may store data received or generated from other components in a non-volatile memory. The external memory may include, for example, at least one of Compact Flash (CF), Secure Digital (SD), Micro Secure Digital (Micro-SD), Mini Secure Digital (Mini-SD), extreme Digital (xD), or Memory Stick.

The programs stored in the storage unit 370 may be classified into a plurality of modules according to their functions and may include, for example, a lens characteristic obtaining module 371, an eye image obtaining module 372, a distortion compensation module 373, a feature point detecting module 374, and a gaze detecting module 375. For example, a memory (not illustrated) may be included in the gaze tracking sensor 340, and in this case, the eye image obtaining module 372 may be stored as firmware in the memory (not illustrated) included in the gaze tracking sensor 340.

The processor 360 may control an overall operation of the AR device 300. For example, the processor 360 may overall control the display unit 310, the vision correction lens 320, the gaze tracking sensor 340, the storage unit 370, and the like by executing the programs stored in the storage unit 370.

The processor 360 may determine the gaze point and the gaze direction of the user by executing the lens characteristic obtaining module 371, the eye image obtaining module 372, the distortion compensation module 373, the feature point detecting module 374, and the gaze detecting module 375 stored in the storage unit 370.

According to an embodiment of the disclosure, the AR device 300 may include a plurality of processors 360, and the lens characteristic obtaining module 371, the eye image obtaining module 372, the distortion compensation module 373, the feature point detecting module 374, and the gaze detecting module 375 may be executed by the plurality of processors 360.

For example, some of the lens characteristic obtaining module 371, the eye image obtaining module 372, the distortion compensation module 373, the feature point detecting module 374, and the gaze detecting module 375 may be executed by a first processor (not illustrated), and the others of the lens characteristic obtaining module 371, the eye image obtaining module 372, the distortion compensation module 373, the feature point detecting module 374, and the gaze detecting module 375 may be executed by a second processor (not illustrated); however, the disclosure is not limited thereto.

For example, the gaze tracking sensor 340 may include another processor (not illustrated) and a memory (not illustrated), the other processor (not illustrated) may execute the eye image obtaining module 372 stored in the memory (not illustrated), and the processor 360 may execute the lens characteristic obtaining module 371, the distortion compensation module 373, the feature point detecting module 374, and the gaze detecting module 375 stored in the storage unit 370.

The processor 360 may obtain the lens characteristic information about the vision correction lens 320 by executing the lens characteristic obtaining module 371 stored in the storage unit 370. In an embodiment of the disclosure, the light reflector 350 may include a pattern. By executing the lens characteristic obtaining module 371 stored in the storage unit 370, the processor 360 may emit light for obtaining the lens characteristic information toward the light reflector 350 through the light emitter 341, identify the pattern based on the light received through the light receiver 343, and obtain the lens characteristic information about the vision correction lens 320 based on the identified pattern.

In an embodiment of the disclosure, the pattern may be formed to correspond to a partial area on the light guide plate 311. For example, a certain pattern may be formed at a portion of the light guide plate 311 to reflect the light emitted from the light emitter 341 and direct the reflected light toward the light receiver 343. In an embodiment of the disclosure, the pattern may be attached to or coated on a cover glass installed to protect the light guide plate 311 or the vision correction lens 320 for correcting the vision of the user.

In an embodiment of the disclosure, an indicator used to obtain the lens characteristic information about the vision correction lens 320 may be included, and the processor 360 may identify the indicator to obtain the lens characteristic information about the vision correction lens 320 by executing the lens characteristic obtaining module 371 stored in the storage unit 370. For example, the indicator may include a label such as a barcode or a quick response (QR) code, a test, or the like.

In an embodiment of the disclosure, the vision correction lens 320 may include a coupling unit for coupling to the support unit 330 of the AR device 300, and the processor 360 may obtain an electromagnetic signal through the coupling unit and obtain the lens characteristic information about the vision correction lens 320 based on the obtained electromagnetic signal by executing the lens characteristic obtaining module 371 stored in the storage unit 370. For example, the processor 360 may obtain the lens characteristic information about the vision correction lens 320 by applying an electromagnetic signal to the vision correction lens 320 through the coupling unit and obtaining a corresponding electromagnetic return signal from the vision correction lens 320. In an embodiment of the disclosure, the coupling unit may be arranged at a portion where the vision correction lens 320 contacts the support unit 330. For example, the coupling unit may be arranged along the outer surface of the vision correction lens 320 where the vision correction lens 320 contacts a frame of the support unit 330.

In an embodiment of the disclosure, the vision correction lens 320 may include a varifocal lens. The varifocal lens may be a lens having a variable focus and may include, for example, a liquid crystal lens (LC lens), a liquid membrane lens, an electrowetting lens, or an Alvarez lens. For example, the varifocal lens may be implemented in the form in which a flexible plastic membrane covers a transparent fluid. Also, as the fluid in the varifocal lens moves according to an electrical signal applied to the varifocal lens, the refractive index (diopter) of the varifocal lens may be changed. In this case, the processor 360 may identify the lens characteristic information about the vision correction lens 320 from the refraction parameters set in the varifocal lens by executing the lens characteristic obtaining module 371 stored in the storage unit 370.

The processor 360 may obtain an eye image from the reflected light received through the light receiver 343 by executing the eye image obtaining module 372 stored in the storage unit 370. The reflected light received through the light receiver 343 may represent the light identified when the light reflected from the user's eye is reflected back from the light reflector 350. For example, when the light emitter 341 is an IR LED and the light receiver 343 corresponding thereto is an IR camera, the obtained eye image may be an IR image.

The processor 360 may adjust the eye image of the user based on the lens characteristic information about the vision correction lens 320 by executing the distortion compensation module 373 stored in the storage unit 370.

The processor 360 may detect features related to the gaze of the eye of the user by executing the feature point detecting module 374 stored in the storage unit 370. For example, the processor 360 may detect the position of the center point and the position of the feature point of the pupil (pupil feature point) of the user's eye by executing the feature point detecting module 374. The feature point of the pupil may include, for example, a glint feature point of the eye. The glint feature point of the eye may be a portion having a brightness greater than or equal to a certain value in the detected areas of the eye. The position of the center point and the position of the feature point of the pupil may be identified by, for example, a coordinate value representing a position in the coordinate system of the light receiver 343. For example, the coordinate system of the light receiver 343 may be the coordinate system of the IR camera, and the coordinate value in the coordinate system of the light receiver 343 may be a 2D coordinate value.

The processor 360 may detect features related to the gaze of the eye by analyzing the light received by the light receiver 343. For example, when the light receiver 343 is an IR camera, the processor 360 may identify the position of the center point and the position of the feature point of the pupil in the image obtained by the IR camera. When the position of the feature points is detected, the position of the center point or the position of the feature point of the pupil may have a value corrected by reflecting the lens characteristic information about the vision correction lens 320. The position of the center point and the position of the feature point of the pupil corrected by reflecting the lens characteristic information about the vision correction lens 320 will be described in more detail with reference to FIG. 8 described below.

Also, the processor 360 may obtain a coordinate value representing the position of the feature point of the pupil and a coordinate value representing the position of the center point thereof by analyzing the light received by the light receiver 343. For example, when the light receiver 343 includes a camera, the processor 360 may obtain the coordinate value of the center point and the coordinate value of the feature point of the pupil in the coordinate system of the camera. The coordinate system of the camera may be used to represent the position of the center point and the position of the feature point of the pupil, and for example, the coordinate values on the coordinate system of the camera corresponding to the pixels of the image obtained by the camera may be preset. Also, the coordinate value corresponding to the feature point of the eye may be identified based on the attribute (e.g., brightness) of the light received through the camera.

The processor 360 may obtain information about the gaze of the user by executing the gaze detecting module 375 stored in the storage unit 370. The processor 360 may calculate the position of the center of the user's eye by executing the gaze detecting module 375. The center of the user's eye may represent the center of an area corresponding to the iris in the user's eyeball, that is, the position of the pupil. The gaze direction of the user and the position of the gaze point of the user may be obtained from the position of the pupil. For example, the position on the light guide plate 311 corresponding to the center point of the pupil of the user may be identified as the position of the gaze point of the user, and the direction from the pupil of the user to the gaze point may be identified as the gaze direction of the user. The processor 360 may calculate the position of the pupil of the user through the lens characteristic information about the lens and the feature point included in the eye image of the user.

The processor 360 may calculate the position of the gaze point of the user by executing the gaze detecting module 375. In order to calculate the position of the gaze point of the user, the processor 360 may previously generate a mapping function for calculating the position of the gaze point from the features of the user's eye. The mapping function may be a function for calculating the position of the gaze point of the user by considering the characteristics of the user's eye and the lens characteristic information about the vision correction lens 320 and may be generated through a pre-performed calibration process. For example, the position of the gaze point may have a three dimensional (3D) coordinate value in the coordinate system of the real space; however, the disclosure is not limited thereto. For example, when the center point of the light guide plate 311 is set as the origin and the two-dimensional coordinate system parallel to the plane of the light guide plate 311 is represented as the light guide plate coordinate system, the position of the gaze point may have a coordinate value in the light guide plate coordinate system representing the position on the light guide plate 311 corresponding to the pupil center point of the user; however, the disclosure is not limited thereto.

By executing the gaze detecting module 375, the processor 360 may correct the features related to the gaze of the user's eye obtained from the feature point detecting module 374, based on the lens characteristic information about the vision correction lens 320. Also, the processor 360 may calculate the position of the gaze point of the user by applying the features related to the gaze of the user's eye corrected based on the lens characteristics to the mapping function. Also, the gaze direction of the user may be determined based on the gaze point of the user and the position of the center point of the eye calculated by the gaze detecting module 375.

The processor 360 may previously perform a calibration operation before performing an operation of detecting the gaze of the user. In the calibration operation, the mapping function may be calibrated based on the lens characteristic information about the vision correction lens 320. In the calibration operation, the processor 360 may calibrate the mapping function to obtain the gaze point of the user based on the lens characteristics and the feature points of the eye. For example, in the calibration operation, the degree of distortion of the eye image may be calculated according to the lens characteristic information about the vision correction lens 320, and a compensation value for the position of the center point and the feature point of the eye may be calculated. The processor 360 may calibrate the mapping function such that a target gaze direction value may be output from the mapping function into which the position of the feature points of the user's eye and the lens characteristic information about the vision correction lens 320 are input.

Figure 4:
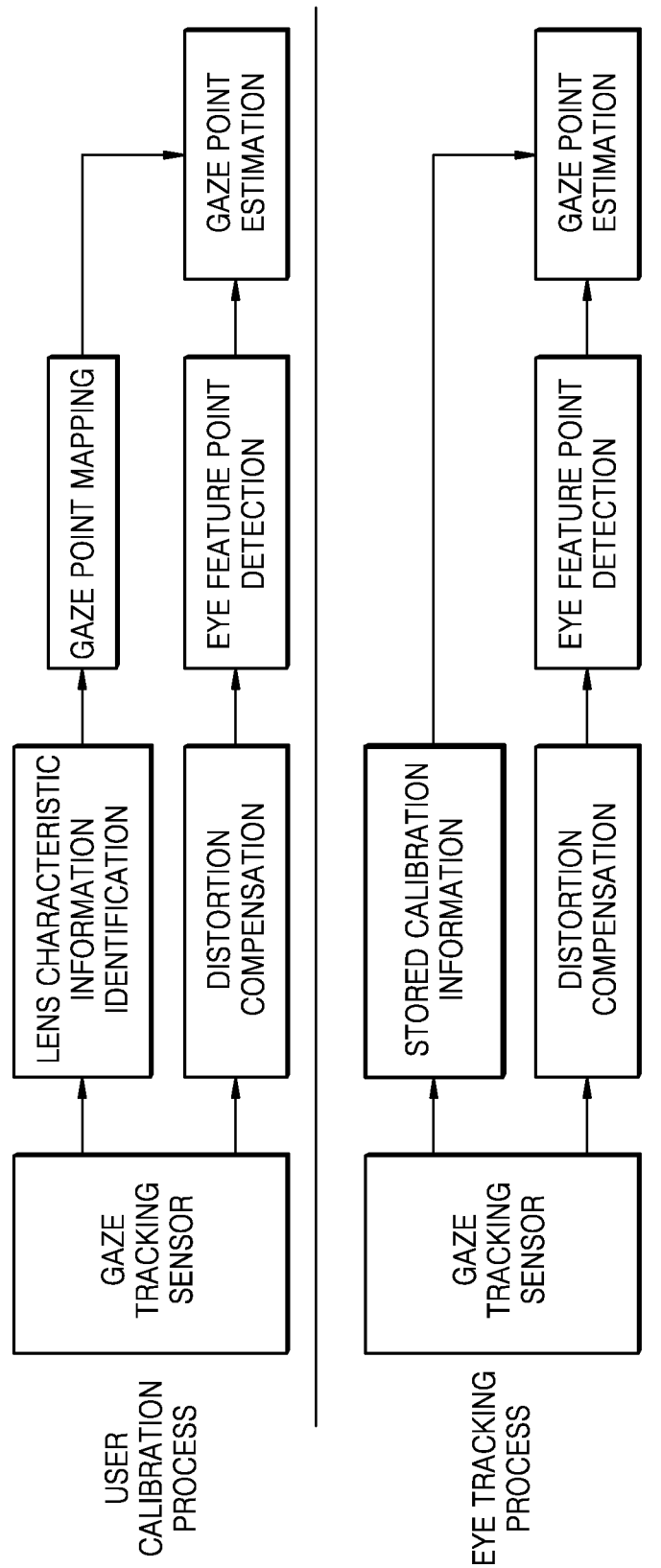
FIG. 4 is a diagram for describing an operation in which an AR device detects a gaze of a user, according to an embodiment of the disclosure.

FIG. 4 is a diagram for describing an operation in which an AR device detects a gaze of a user, according to an embodiment of the disclosure.

Referring to FIG. 4, an AR device including a vision correction lens may include a user calibration process and an eye tracking process. In the user calibration process, the lens characteristic information about the vision correction lens may be identified, and the degree of distortion of the eye image of the user obtained by the AR device including the vision correction lens may be estimated. In the eye tracking process, the gaze of the user wearing the AR device may be tracked by reflecting the degree of distortion estimated in the user calibration process.

Figure 5:
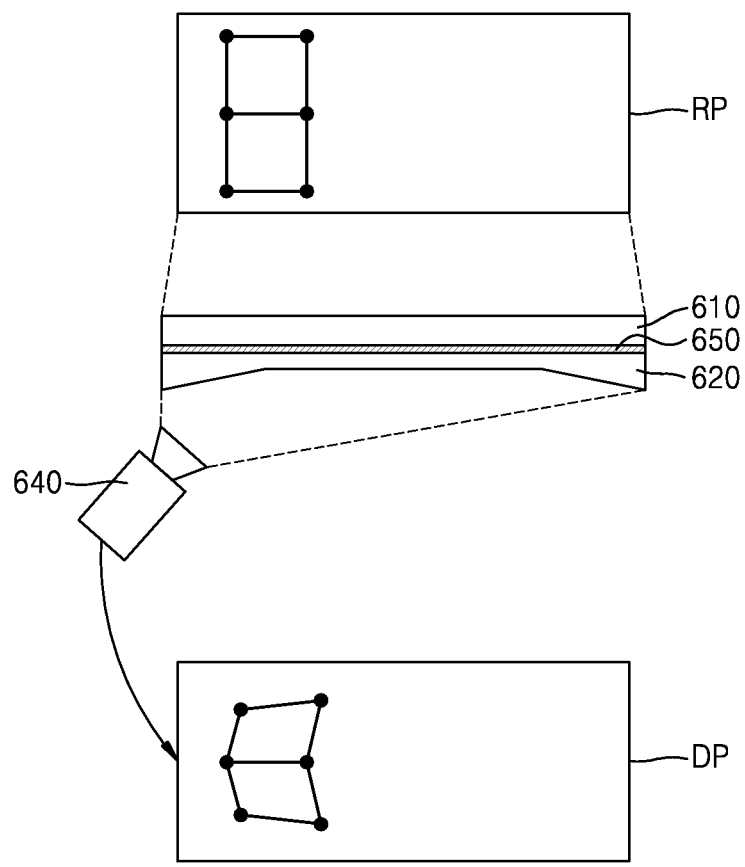
FIG. 5 is a diagram for describing an operation of obtaining lens characteristic information about a vision correction lens, according to an embodiment of the disclosure.

FIG. 5 is a diagram for describing an operation of obtaining lens characteristic information about a vision correction lens, according to an embodiment of the disclosure.

Referring to FIG. 5, an AR device may include a display unit 610, a vision correction lens 620, and a light reflector 650 arranged between the display unit 610 and the vision correction lens 620. The light reflector 650 may include a pattern RP.

In an embodiment of the disclosure, the pattern RP may be formed to correspond to a partial area on the display unit 610. For example, a certain pattern RP may be formed at a portion on the display unit 610 by which the light emitted from a light emitter may be reflected and directed toward a light receiver.

In an embodiment of the disclosure, a gaze tracking sensor 640 may emit light for obtaining the lens characteristics of the vision correction lens 620 toward the light reflector 650 through the light emitter. The light emitted from the gaze tracking sensor 640 through the light emitter may be directed to the light reflector 650 through the vision correction lens 620. Thereafter, the light may be reflected by the light reflector 650, pass through the vision correction lens 620, and arrive at the light receiver of the gaze tracking sensor 640. The AR device may identify a distorted pattern DP formed by the distortion of the pattern RP included in the light reflector 650 based on the light received through the light receiver and obtain the lens characteristic information about the vision correction lens 620 based on the identified distorted pattern DP.

For example, information related to an actual pattern RP included in the light reflector 650 may be prestored in the AR device. The AR device may identify the distorted pattern DP from the light received through the light receiver of the gaze tracking sensor 640. The distorted pattern DP may be formed because the gaze tracking sensor 640 photographs the actual pattern RP through the vision correction lens 620 and the light reflected from the actual pattern RP is refracted through the vision correction lens 620.

The AR device may obtain the lens characteristic information about the vision correction lens 620 by comparing the actual pattern RP included in the light reflector 650 and the distorted pattern DP identified from the light received through the light receiver. For example, the AR device may obtain the lens characteristic information about the vision correction lens 620 by comparing the position of the vertexes on the real pattern RP with the position of the vertexes on the distorted pattern DP and comparing the lengths, positions, directions, and degrees of bending of the edges on the real pattern RP and the edges on the distorted pattern DP.

In an embodiment of the disclosure, the lens characteristic information about the vision correction lens 620 may include difference value information about each vertex in the pattern or characteristic change information about each edge.

The difference value information about a particular vertex may represent information related to the difference value between the position of the particular vertex in the actual pattern RP and the position of the corresponding vertex in the distorted pattern DP. For example, when considering a vector from the position of the particular vertex in the real pattern RP to the position of the corresponding vertex in the distorted pattern DP, information about the size and direction of the vector may be included.

The characteristic change information about a particular edge may represent information related to the difference between the characteristics of the particular edge in the actual pattern RP and the characteristics of the corresponding edge in the distorted pattern DP. For example, it may include information related to the difference between the length of the particular edge in the actual pattern RP and the length of the corresponding edge in the distorted pattern DP or information related to the difference between the degree of bending of the particular edge in the actual pattern RP and the degree of bending of the corresponding edge in the distorted pattern DP.

In an embodiment of the disclosure, the degree of deformation of each point in the image captured through the vision correction lens 620 when compared with the actual image may be obtained from the difference value information about each vertex. Also, the degree of deformation of each line in the image captured through the vision correction lens 620 when compared with the actual image may be obtained from the characteristic change information about each edge. Thus, according to the lens characteristic information about the vision correction lens 620, to what extent the image captured through the vision correction lens 620 has been deformed from the actual image may be detected, and the actual image may be calculated by compensating for the degree of distortion of the obtained (distorted) image.

An operation in which the AR device obtains the lens characteristic information about the vision correction lens 620 is not limited to the above operation, and the lens characteristic information may be obtained through various operations. Thereafter, the obtained lens characteristic information about the vision correction lens 620 may be used for an operation of compensating for the distortion of the eye image and an operation of adjusting the gaze tracking result accordingly.

Figure 6:
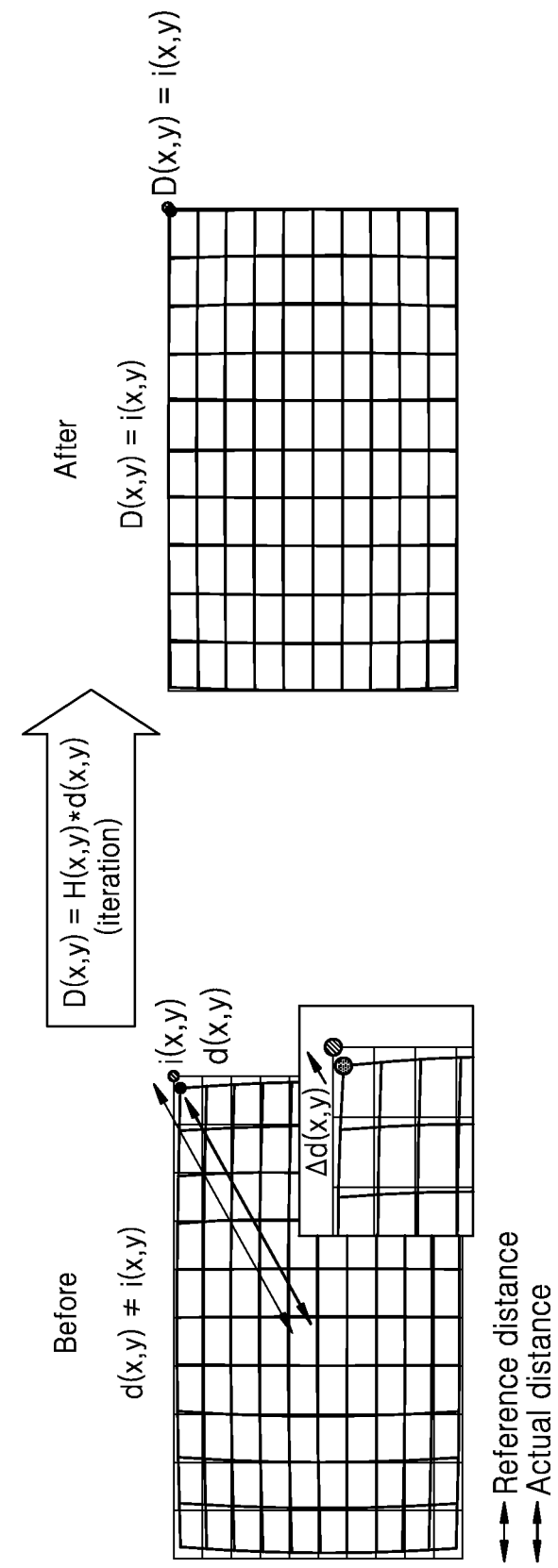
FIG. 6 is a diagram for describing an operation of adjusting an eye image based on lens characteristic information about a vision correction lens, according to an embodiment of the disclosure.

FIG. 6 is a diagram for describing an operation of adjusting an eye image based on lens characteristic information about a vision correction lens, according to an embodiment of the disclosure.

In the AR device including the vision correcting lens, when the light reflector is arranged between the vision correcting lens and the light guide plate, the eye image of the user obtained from the light traveling through the path of the light emitter—the vision correcting lens—the light reflector—the vision correcting lens—the user's eye—the vision correcting lens—the light reflector—the vision correction lens—light receiver may include the distortion due to the vision correction lens. When the gaze information of the user is obtained through the eye image including the distortion, the obtained gaze information of the user may have a difference from the gaze direction in which the user gazes actually. Thus, in order to improve the accuracy of gaze tracking, it may be necessary to compensate for the degree of distortion of the eye image of the user.

A distortion compensation function $H(x,y)$ may be used in an operation of compensating for the degree of distortion of the image. The lens characteristic information about the vision correction lens may be used to generate the distortion compensation function $H(x,y)$.

In an embodiment of the disclosure, when the user wears the AR device, a case in which a grid pattern image i is located at a position where the user's eye is to be arranged may be considered. In this case, a distorted grid pattern image d may be obtained from the light traveling through path of the light emitter—the vision correction lens—the light reflector—the vision correction lens—the grid pattern image—the vision correction lens—the light reflector—the vision correction lens—the light receiver.

Moreover, in an embodiment of the disclosure, the degree to which the eye image of the user is to be distorted may be calculated by using the lens characteristic information about the vision correction lens.

Referring to FIG. 6, when x denotes an index in the x-axis direction of a particular vertex on a grid pattern and y denotes an index in the y-axis direction of the particular vertex on the grid pattern, $i(x,y)$ denotes a coordinate value of a vertex $(x,y)$ from a center point (or a preset origin) in the actual grid pattern image i and $d(x,y)$ denotes a coordinate value of the vertex $(x,y)$ from a center point (or a preset origin) in the distorted grid pattern image d. Before compensating for the degree of distortion of the image, with respect to at least one vertex $(x,y)$, it may be seen that the coordinate value $i(x,y)$ on the actual grid pattern image and the coordinate value $d(x,y)$ on the distorted grid pattern image are different from each other.

The operation of compensating for the degree of distortion of the image may represent an operation of obtaining an adjusted grid pattern image D from the distorted grid pattern image d such that a difference ($^{\Delta}d(x,y)=i(x,y)-D(x,y)$) between a coordinate value $D(x,y)$ on the adjusted grid pattern image D and a coordinate value $i(x,y)$ on the actual grid pattern image may be less than a preset threshold value $\delta$ with respect to all vertexes $(x,y)$.

Here, the coordinate value D(x,y) on the adjusted grid pattern image D may be obtained by multiplying d(x,y) by the distortion compensation function H(x,y). That is, Equation 1 below may be satisfied.

$$D(x,y)=H(x,y)*d(x,y) \quad \text{Equation 1}$$

That is, according to an embodiment of the disclosure, by using the lens characteristic information about the vision correction lens, how much distortion is included when the actual eye image is obtained through the gaze tracking sensor may be determined, and the distortion compensation function H(x,y) for adjusting the obtained eye image may be obtained.

The lens characteristic information about the vision correction lens may be obtained through the method described above with reference to FIG. 5. For example, the lens characteristic information may include information about in which direction and by what distance each point in the image captured through the vision correction lens has moved when compared with the actual image. Also, the lens characteristic information may include information about to what degree the length or the degree of bending of each line in the image captured through the vision correction lens has been deformed when compared with the actual image.

Thus, according to the lens characteristic information about the vision correction lens, to what extent the image captured through the vision correction lens has been deformed from the actual image may be detected, and the distortion compensation function H(x,y) for compensating for the degree of distortion of the obtained (distorted) image may be obtained.

As such, according to an embodiment of the disclosure, because the distortion of the eye image is compensated for by using the obtained distortion compensation function H(x,y) and the gaze of the user is detected from the adjusted eye image, the accuracy of the gaze tracking result may be improved.

Figure 7:
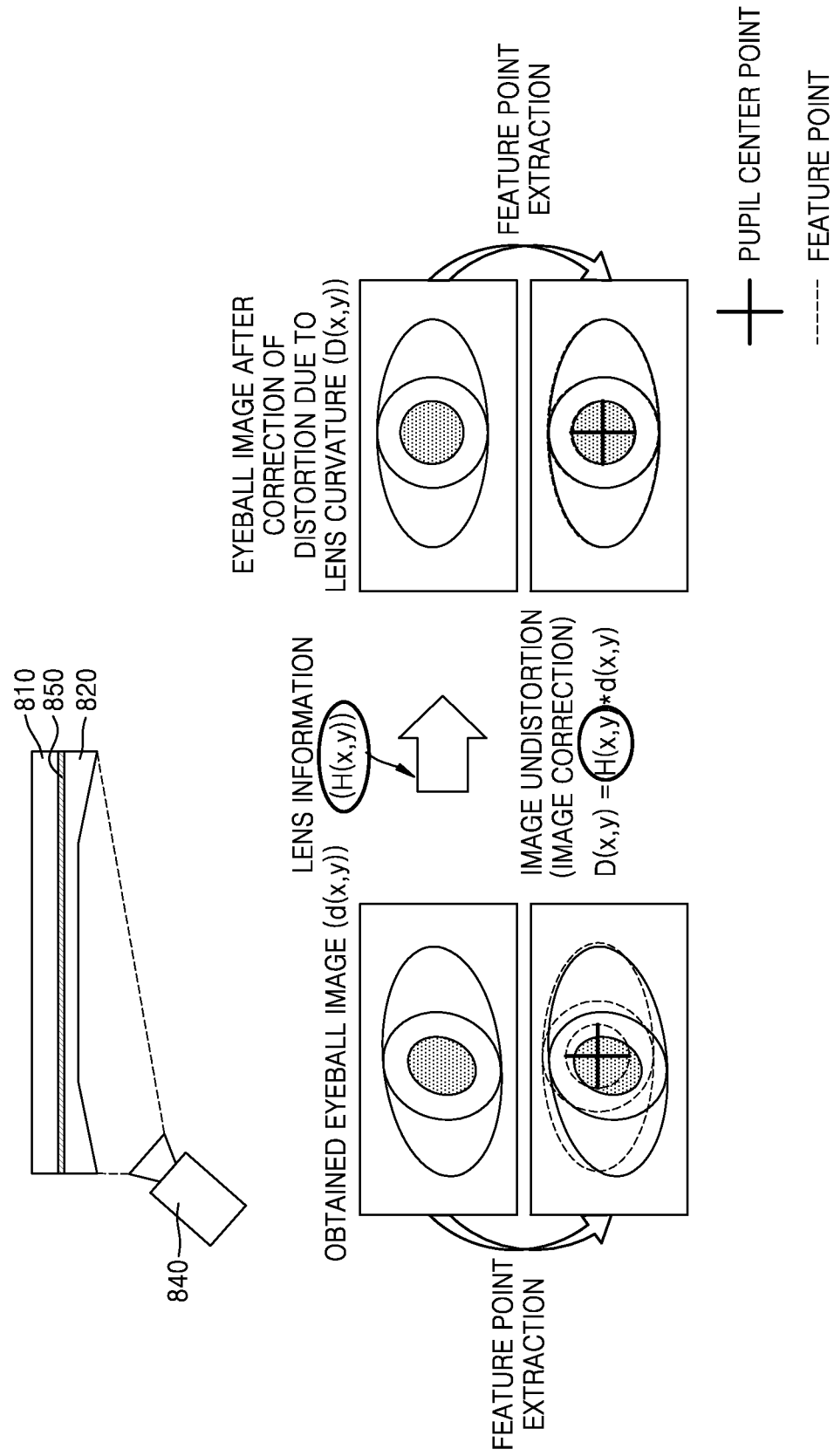
FIG. 7 is a diagram for describing an operation of obtaining gaze information about a user from an eye image adjusted based on lens characteristic information about a vision correction lens, according to an embodiment of the disclosure.

FIG. 7 is a diagram for describing an operation of obtaining gaze information of a user from an eye image adjusted based on lens characteristic information about a vision correction lens, according to an embodiment of the disclosure.

Referring to FIG. 7, an AR device may include a display unit 810, a vision correction lens 820, and a light reflector 850 arranged between the display unit 810 and the vision correction lens 820.

In an embodiment of the disclosure, a gaze tracking sensor 840 may emit light for tracking the gaze of the user wearing the AR device toward the light reflector 850 through the light emitter. The light emitted from the gaze tracking sensor 840 through the light emitter may be directed to the light reflector 850 through the vision correction lens 820. Thereafter, the light may be sequentially reflected by the light reflector 850, the user's eye, and the light reflector 850 again and arrive at the light receiver of the gaze tracking sensor 840. The AR device may obtain an eye image of the user based on the light received through the light receiver.

As described above with reference to FIG. 6, in the AR device including the vision correction lens 820, when the light reflector 850 is arranged between the vision correction lens 820 and the display unit 810, the eye image of the user obtained from the light traveling through the path of the light emitter—the vision correction lens 820—the light reflector 850—the vision correction lens 820—the user's eye—the vision correction lens 820—the light reflector 850—the vision correction lens 820—the light receiver may include the distortion due to the vision correction lens 820. Thus, in order to improve the accuracy of gaze tracking, it may be necessary to compensate for the degree of distortion of the eye image of the user.

Referring to FIG. 7, the AR device may obtain an eyeball image d(x,y) through the light receiver. The obtained eyeball image d(x,y) may include the distortion due to the vision correction lens 820. When the gaze direction of the user, that is, the user's pupil position information is obtained by directly extracting the eyeball feature point from the eyeball image d(x,y), the obtained user's pupil position may not correspond to the actual gaze direction of the user due to the image distortion.

Thus, the AR device according to an embodiment of the disclosure may adjust the eyeball image d(x,y) by using the distortion compensation function H(x,y) obtained by the method described above with reference to FIG. 6 and detect the user's pupil position information and the user's gaze information from the adjusted eye image. That is, according to an embodiment of the disclosure, because the gaze of the user is detected from the eye image adjusted by using the distortion compensation function H(x,y) obtained by using the lens characteristic information about the vision correction lens 820, the accuracy of the gaze tracking result may be improved.

Figure 8:
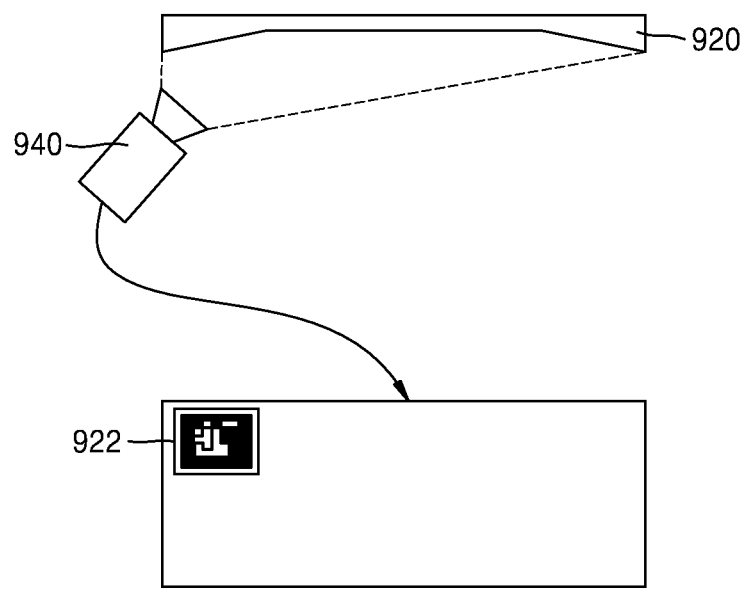
FIG. 8 is a diagram for describing an operation of obtaining lens characteristic information about a vision correction lens, according to an embodiment of the disclosure.

FIG. 8 is a diagram for describing an operation of obtaining lens characteristic information about a vision correction lens, according to an embodiment of the disclosure, and FIG. 9 is a diagram for describing an operation of obtaining lens characteristic information about a vision correction lens, according to an embodiment of the disclosure.

Referring to FIG. 8, an indicator 922 used to obtain the lens characteristic information about a vision correction lens 920 may be displayed on the vision correction lens 920. The processor of the AR device may obtain the lens characteristic information about the vision correction lens 920 by identifying the indicator 922. In an embodiment of the disclosure, the processor may emit light toward the indicator 922 by controlling the light emitter included in gaze tracking sensor 940, and identify the indicator 922 based on the light received through the light receiver included in gaze tracking sensor 940.

Referring to parts (a) and (b) of FIG. 9, a vision correction lens 1020 may include a coupling unit 1022 for coupling to the support unit of the AR device. In this case, the processor of the AR device may obtain the lens characteristic information about the vision correction lens 1020 by applying an electromagnetic signal to the vision correction lens 1020 through the coupling unit 1022 and obtaining a corresponding electromagnetic return signal from the vision correction lens 1020.

FIG. 10 is a diagram for describing a control parameter of a vision correction lens according to an embodiment of the disclosure.

Referring to parts (a) and (b) of FIG. 10, in an embodiment of the disclosure, an AR device include a display unit 1110, a light reflector 1150, and a vision correction lens, and the vision correction lens may include a varifocal lens 1123. The AR device of FIG. 10 may correspond to the AR device of FIG. 3. The varifocal lens 1123 may be controlled by using the refractive index according to position and the position of a center point (aperture center) as a control parameter. In this case, the processor may set the control parameter for controlling the varifocal lens 1123 and obtain the lens characteristic information about the vision correction lens based on the set control parameter.

Figure 11:
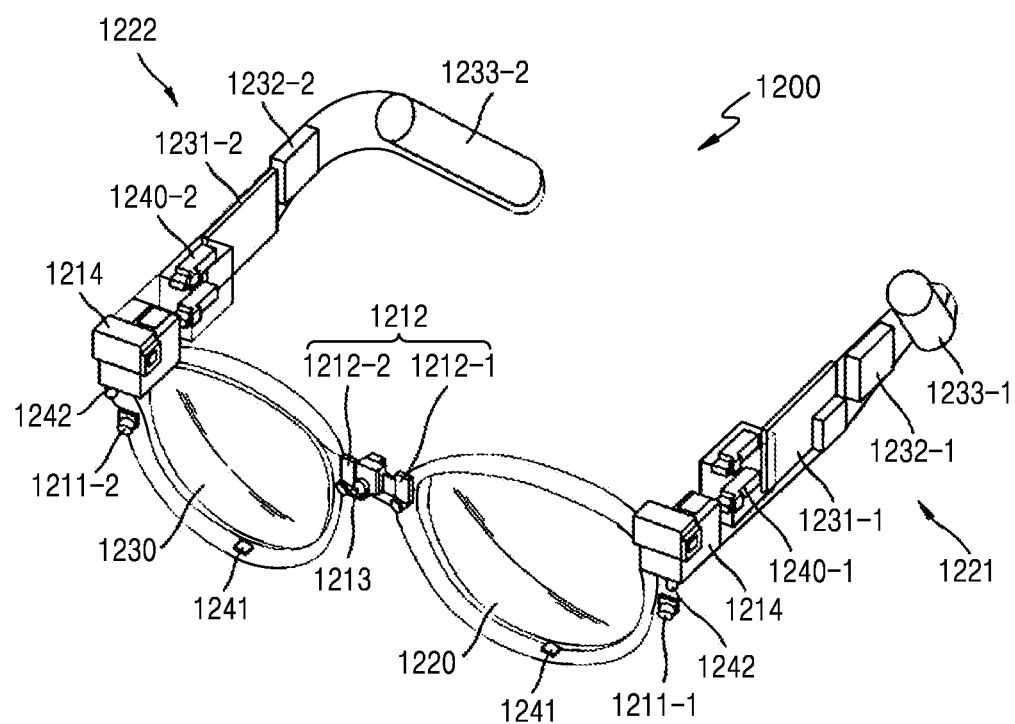
FIG. 11 is a diagram illustrating an AR device according to an embodiment of the disclosure.

FIG. 11 is a diagram illustrating an AR device according to an embodiment of the disclosure.

Referring to FIG. 11, an AR device 1200 for detecting the gaze of the user is illustrated. The AR device 1200 may include glasses-shaped AR glasses worn by the user on the face, a head-mounted display (HMD), a virtual reality headset (VRH), or an AR helmet worn on the head, or the like. In the case of the AR device 1200, by arranging the display in front of the user's eye, because the screen moves according to the user's movement, a real scene and a realistic virtual image may be provided.

In an embodiment of the disclosure, the user may wear the AR device 1200 that may display visual extended reality content. The AR device 1200 may include an audio module that may provide audio extended reality content to the user. In an embodiment of the disclosure, the AR device 1200 may include one or more cameras that may capture an image and a video therearound. The AR device 1200 may include a gaze tracking (eye tracking) system to determine the vergence distance of the user. In an embodiment of the disclosure, the AR device 1200 may include a lightweight head-mounted display (HMD) (e.g., goggles, glasses, visor, or the like). In an embodiment of the disclosure, the AR device 1200 may include a non-HMD device such as laser projection glasses (e.g., glasses that may project a low-powered laser onto the user's retina in order to project and display image or depth content to the user).

In an embodiment of the disclosure, the AR device 1200 may provide an AR service that outputs at least one virtual object to be viewed as overlapping in an area determined as the user's field of view (FOV). For example, the area determined as the user's FOV may be an area determined to be recognized through the AR device 1200 by the user wearing the AR device 1200 or may be an area including at least a portion or all of the display of the AR device 1200. In an embodiment of the disclosure, the AR device 1200 may include a plurality of transparent members (e.g., displays 1220 and 1230) respectively corresponding to both eyes of the user.

In an embodiment of the disclosure, the AR device 1200 may include a display module 1214, a camera, an audio output unit, and support units 1221 and 1222.

The camera may obtain an image corresponding to the user's FOV or measure the distance to an object. In an embodiment of the disclosure, the camera may be used for head tracking and space recognition. Also, the camera may recognize the user's movement.

In an embodiment of the disclosure, the camera may further include an 'eye tracking (ET) camera 1212' in addition to a camera 1213 used to detect an image corresponding to the user's FOV, that is, the movement of an object, or used for space recognition. In an embodiment of the disclosure, the ET camera 1212 may be used to detect and track the user's pupil. The ET camera 1212 may be used to adjust the center of a virtual image projected on the AR device 1200 to be located according to the gaze direction of the pupil of the user wearing the AR device 1200. The ET camera 1212 may correspond to the light receiver 343 of FIG. 3 described above. For example, a global shutter (GS) camera may be used in the ET camera 1212 to detect the pupil and track a rapid pupil movement without delay. The ET camera 1212 may separately include a left-eye camera 1212-1 and a right-eye camera 1212-2.

In an embodiment of the disclosure, the display module 1214 may include a first display 1220 and a second display 1230. The display module 1214 may correspond to the display unit 310 of FIG. 3 described above. A virtual object output through the display module 1214 may include information related to an application program executed in the AR device 1200 or information related to an external object located in the real space corresponding to an area determined as the user's FOV. For example, the AR device 1200 may identify an external object included in at least a portion corresponding to an area determined as the user's FOV among the image information related to the real space obtained through the camera 1213. The AR device 1200 may output a virtual object related to the external object identified in at least a portion through an area determined as the user's FOV among the display area of the AR device 1200. The external object may include an object existing in the real space.

In an embodiment of the disclosure, the displays 1220 and 1230 may include a condensing lens, a vision correcting lens, or a light guide plate (waveguide) in a transparent member. The light guide plate may correspond to the light guide plate 311 of FIG. 3 described above. For example, the transparent member may be formed of a glass plate, a plastic plate, or a polymer and may be manufactured to be completely transparent or semitransparent. In an embodiment of the disclosure, the transparent member may include a first transparent member (e.g., the second display 1230) facing the right eye of the user wearing the AR device 1200 and a second transparent member (e.g., the first display 1220) facing the left eye of the user. When the display is transparent, it may be arranged at a position facing the user's eye to display the screen.

The light guide plate may transmit the light generated by the light source of the display to the user's eye. For example, the light guide plate may be at least partially located at a portion of the transparent members (e.g., displays 1220 and 1230). According to an embodiment of the disclosure, the light emitted from the display may be input through one end of the light guide plate, and the input light may be transmitted to the user's eye through total internal reflection in the light guide plate. The light guide plate may be formed of a transparent material such as glass, plastic, or polymer and may include a nano pattern formed on an inner or outer surface, for example, a polygonal or curved grating structure. In an embodiment of the disclosure, the input light may be propagated or reflected in the light guide plate by the nano pattern and provided to the user's eye. In an embodiment of the disclosure, the light guide plate may include at least one of at least one diffraction element (e.g., a diffractive optical element (DOE) or a holographic optical element (HOE)) or a reflection element (e.g., a mirror). In an embodiment of the disclosure, the light guide plate may guide the display light emitted from the light source to the user's eye by using at least one diffraction element or a reflection element.

In an embodiment of the disclosure, the displays 1220 and 1230 may include a display panel or a lens (e.g., a glass). For example, the display panel may include a transparent material such as glass or plastic. In an embodiment of the disclosure, the display may be configured as a transparent element, and the user may recognize the real space behind the display through the display. The display may display a virtual object in at least a partial area of the transparent element such that the user may see the virtual object as being added to at least a portion of the real space.

In an embodiment of the disclosure, the support units 1221 and 1222 may include printed circuit boards (PCBs) 1231-1 and 1231-2 for transmitting electrical signals to the respective components of the AR device 1200, speakers 1232-1 and 1232-2 for outputting audio signals, or batteries 1233-1 and 1233-2 for supplying power. The support units 1221 and 1222 may correspond to the support unit 330 of FIG. 3 described above. For example, in the glasses-type AR device 1200, the support units 1221 and 1222 may be arranged at the temples of the glasses. The support units 1221 and 1222 may include hinge units 1240-1 and 1240-2 for coupling to the main body of the AR device 1200. The speakers 1232-1 and 1232-2 may include a first speaker 1232-1 for transmitting an audio signal to the user's left ear and a second speaker 1232-2 for transmitting an audio signal to the user's right ear.

Referring to FIG. 11, the AR device 1200 may include a microphone 1241 for receiving the user's voice and ambient sound. Also, the AR device 1200 may include at least one light emitting device (illumination LED) 1242 in order to improve the accuracy of at least one camera (e.g., the ET camera 1212, the outward camera 1213, or recognition cameras 1211-1 and 1211-2). For example, the light emitting device 1242 may be used as an auxiliary mechanism for improving the accuracy when photographing the user's pupil with the ET camera 1212, and the light emitting device 1242 may use an IR LED of an infrared wavelength instead of a visible light wavelength. In an embodiment of the disclosure, the light emitting device 1242 may correspond to the light emitter 341 of FIG. 3 described above. For example, the light emitting device 1242 may be used as an auxiliary mechanism when it is difficult to detect a subject due to a dark environment when photographing the user's gesture with the recognition cameras 1211-1 and 1211-2.

According to an embodiment of the disclosure, the display module 1214 may include a first light guide plate (e.g., first display 1220) corresponding to the left eye and a second light guide plate (e.g., second display 1230) corresponding to the right eye and may provide visual information to the user through the first light guide plate (e.g., first display 1220) and the second light guide plate (e.g., second display 1230). According to an embodiment of the disclosure, the display module 1214 may include a display panel and a lens (e.g., a glass lens, a plastic lens, or an LC lens). The display panel may include a transparent material such as glass or plastic.

According to an embodiment of the disclosure, the display module 1214 may be configured as a transparent element, and the user may recognize the real space behind the display module 1214 and in front of the user through the display module 1214. The display module 1214 may display a virtual object in at least a partial area of the transparent element such that the user may see the virtual object as being added to at least a portion of the real space.

In an embodiment of the disclosure, the AR device 1200 may identify an external object included in at least a portion corresponding to an area determined as the user's FOV among the image information related to the real space obtained through the outward camera 1213. The AR device 1200 may output (or display) a virtual object related to the external object identified in at least a portion through an area determined as the user's FOV among the display area of the AR device 1200. The external object may include an object existing in the real space. According to various embodiments of the disclosure, the display area in which the AR device 1200 displays a virtual object may include a portion of the display module 1214 (e.g., at least a portion of the display panel). According to an embodiment of the disclosure, the display area may be an area corresponding to at least a portion of the first light guide plate (e.g., first display 1220) and the second light guide plate (e.g., second display 1230).

According to an embodiment of the disclosure, the AR device 1200 may measure the distance to a physical object located in the front of the AR device 1200 by using the outward camera 1213. The outward camera 1213 may include a high-resolution (HR) camera such as a photo video (PV) camera.

The AR device 1200 according to an embodiment of the disclosure is not limited to the above configuration and may include various components in various numbers at various positions.

Various embodiments of the disclosure may be implemented or supported by one or more computer programs, and the computer programs may be formed from computer-readable program code and may be included in a computer-readable medium. In the disclosure, the terms "application" and "program" may refer to one or more computer programs, software components, instruction sets, procedures, functions, objects, classes, instances, related data, or a portion thereof suitable for implementation in computer-readable program code. The "computer readable program code" may include various types of computer code including source code, object code, and executable code. The "computer-readable medium" may include various types of mediums accessed by a computer, such as read only memories (ROMs), random access memories (RAMs), hard disk drives (HDDs), compact disks (CDs), digital video disks (DVDs), or various types of memories.

Also, a machine-readable storage medium may be provided in the form of a non-transitory storage medium. Here, the 'non-transitory storage medium' may be a tangible device and may exclude wired, wireless, optical, or other communication links for transmitting temporary electrical or other signals. Moreover, the 'non-transitory storage medium' may not distinguish between a case where data is semi-permanently stored in the storage medium and a case where data is temporarily stored therein. For example, the "non-transitory storage medium" may include a buffer in which data is temporarily stored. The computer-readable medium may be any available medium accessible by a computer and may include volatile or non-volatile mediums and removable or non-removable mediums. The computer-readable medium may include a medium in which data may be permanently stored and a medium in which data may be stored and may be overwritten later, such as a rewritable optical disk or an erasable memory device.

According to an embodiment of the disclosure, the method according to various embodiments of the disclosure may be included and provided in a computer program product. The computer program product may be traded as a product between a seller and a buyer. The computer program product may be distributed in the form of a machine-readable storage medium (e.g., a compact disk read only memory (CD-ROM)) or may be distributed (e.g., downloaded or uploaded) online through an application store or directly between two user devices. In the case of online distribution, at least a portion of the computer program product (e.g., a downloadable app) may be at least temporarily stored or temporarily generated in a machine-readable storage medium such as a manufacturer's server, a server of an application store, or a memory of a relay server.

The foregoing is illustrative of embodiments of the disclosure, and those of ordinary skill in the art will readily understand that various modifications may be made therein without materially departing from the spirit or features of the disclosure. Therefore, it is to be understood that the embodiments described above should be considered in a descriptive sense only and not for purposes of limitation. For example, each component described as a single type may also be implemented in a distributed manner, and likewise, components described as being distributed may also be implemented in a combined form.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality (AR) device comprising:
a light guide plate;
a vision correction lens overlapping the light guide plate in a gaze direction of a user wearing the AR device;
a support configured to fix the AR device to a face of the user wearing the AR device;
a gaze tracking sensor including a light receiver and a light emitter disposed at a portion of the support;
a light reflector configured to reflect light for gaze tracking; and
at least one processor configured to:
obtain lens characteristic information about the vision correction lens,
emit light toward the light reflector by controlling the light emitter,
obtain an eye image of the user based on light received through the light receiver,
adjust the eye image of the user based on the lens characteristic information, and
obtain gaze information about the user from the adjusted eye image,
wherein the light emitted toward the light reflector is reflected by the light reflector and directed to an eye of the user,
wherein the light received through the light receiver includes light obtained due to the light directed to the eye of the user being reflected by the eye of the user,
wherein the light reflector includes a pattern, and
wherein the at least one processor is further configured to:
emit light for obtaining the lens characteristic information about the vision correcting lens toward the light reflector by controlling the light emitter,
identify a distorted pattern based on the light received through the light receiver, and
obtain the lens characteristic information about the vision correction lens based on the distorted pattern.

2. The AR device of claim 1, wherein the at least one processor is further configured to:
obtain the lens characteristic information about the vision correction lens by comparing the pattern included in the light reflector with the distorted pattern identified from the light reflected by the light reflector and received through the light receiver.

3. The AR device of claim 1,
wherein an indicator used to obtain the lens characteristic information about the vision correction lens is displayed on the vision correction lens, and
wherein the at least one processor is further configured to:
obtain the lens characteristic information about the vision correction lens by identifying the indicator.

4. The AR device of claim 3, wherein the at least one processor is further configured to:
emit light toward the indicator by controlling the light emitter, and
identify the indicator based on the light received through the light receiver.

5. The AR device of claim 1,
wherein the vision correction lens includes a coupler configured to couple with the support of the AR device, and
wherein the at least one processor is further configured to:
apply an electromagnetic signal to the vision correction lens through the coupler, and
obtain, from the vision correction lens, the lens characteristic information about the vision correction lens by obtaining a corresponding electromagnetic return signal in response to the applied electromagnetic signal.

6. The AR device of claim 1,
wherein the vision correction lens includes a varifocal lens, and
wherein the at least one processor is further configured to:
set a control parameter for controlling the varifocal lens, and
obtain the lens characteristic information about the vision correction lens based on the set control parameter.

7. The AR device of claim 1, wherein the at least one processor is further configured to:
obtain a position of at least one preset feature point and a position of a center point from the adjusted eye image, and
obtain the gaze information of the user based on the position of the at least one preset feature point and the position of the center point.

8. A method, performed by an augmented reality (AR) device including a vision correction lens, of detecting a gaze of a user, the method comprising:
obtaining lens characteristic information about the vision correction lens overlapping a light guide plate, the light guide plate being configured to display an image output from the AR device in a gaze direction of the user;
emitting light for gaze tracking toward a light reflector through a light emitter disposed at a portion of a support of the AR device, wherein the emitted light is reflected by the light reflector and then directed to an eye of the user wearing the AR device;
receiving light reflected by the eye of the user through a light receiver disposed at the support;
obtaining an eye image of the user based on the light received through the light receiver;
adjusting the eye image of the user based on the lens characteristic information about the vision correction lens; and
obtaining gaze information about the user based on the adjusted eye image.

9. The method of claim 8,
wherein the light reflector includes a pattern, and
wherein the obtaining of the lens characteristic information about the vision correction lens includes:
emitting light for obtaining the lens characteristic information toward the light reflector through the light emitter;
identifying a distorted pattern based on the light received through the light receiver; and
obtaining the lens characteristic information about the vision correction lens based on the distorted pattern.

10. The method of claim 9, wherein the obtaining of the lens characteristic information about the vision correction lens based on the distorted pattern comprises obtaining the lens characteristic information about the vision correction lens by comparing the pattern included in the light reflector with the distorted pattern identified from the light reflected by the light reflector and received through the light receiver.

11. The method of claim 8,
wherein an indicator used to obtain the lens characteristic information about the vision correction lens is displayed on the vision correction lens, and
wherein the obtaining of the lens characteristic information about the vision correction lens comprises:
identifying the indicator; and
obtaining the lens characteristic information about the vision correction lens based on the identified indicator.

12. The method of claim 8,
wherein the vision correction lens includes a coupler configured to couple with the support of the AR device, and
wherein the obtaining of the lens characteristic information about the vision correction lens comprises:
applying an electromagnetic signal to the vision correction lens through the coupler;
obtaining, from the vision correction lens, a corresponding electromagnetic return signal in response to the applied electromagnetic signal; and
obtaining the lens characteristic information about the vision correction lens based on the obtained electromagnetic return signal.

13. The method of claim 8,
wherein the vision correction lens includes a varifocal lens, and
wherein the obtaining of the lens characteristic information about the vision correction lens comprises:
setting a control parameter for controlling the varifocal lens; and
obtaining the lens characteristic information about the vision correction lens based on the set control parameter.

14. The method of claim 8, wherein the obtaining of the gaze information about the user based on the adjusted eye image comprises:
obtaining a position of at least one preset feature point and a position of a center point from the adjusted eye image; and
obtaining the gaze information about the user based on the position of the at least one preset feature point and the position of the center point.

15. A non-transitory computer-readable recording medium having recorded thereon a program for performing the method of claim 8 by a computer.

16. The method of claim 8, wherein the gaze direction of the user is represented by a first value of a first vector from a center of a left eye of the user toward a gaze point and a second value of a second vector from a center of a right eye toward the gaze point.

17. The method of claim 10, wherein the obtaining of the lens characteristic information about the vision correction lens comprises comparing a position of vertexes on the pattern included in the light reflector with a position of vertexes on the distorted pattern and comparing lengths, positions, directions, and degrees of bending of edges on the pattern included in the light reflector with edges on the distorted pattern.

18. The method of claim 8, wherein the adjusting of the eye image comprises:
generating a distortion compensation function based on the lens characteristic information about the vision correction lens; and
adjusting the eye image based on the distortion compensation function.

* * * * *